United States Patent
Lenke et al.

(10) Patent No.: US 7,459,110 B2
(45) Date of Patent: Dec. 2, 2008

(54) POROUS FIBER-CERAMIC COMPOSITE

(75) Inventors: Ilka Lenke, Plochingen (DE); Dirk Rogowski, Ebersbach a.d. Fils (DE); Dieter Theil, Esslingen (DE)

(73) Assignee: CeramTec AG, Plochingen (DE)

(*) Notice: Subject to any disclaimer, the term of this patent is extended or adjusted under 35 U.S.C. 154(b) by 606 days.

(21) Appl. No.: 11/001,657

(22) Filed: Dec. 1, 2004

(65) Prior Publication Data
US 2005/0181193 A1   Aug. 18, 2005

(30) Foreign Application Priority Data
Dec. 4, 2003  (DE) ............... 103 57 070
Mar. 13, 2004 (DE) ............ 10 2004 012 407

(51) Int. Cl.
*B29C 31/10* (2006.01)
*B29C 67/20* (2006.01)

(52) U.S. Cl. ............ 264/112; 264/122; 264/69

(58) Field of Classification Search ............ None
See application file for complete search history.

(56) References Cited

U.S. PATENT DOCUMENTS

| | | | |
|---|---|---|---|
| 3,900,626 A | | 8/1975 | Brennan et al. |
| 4,818,633 A | | 4/1989 | Dinwoodie et al. |
| 5,034,356 A | | 7/1991 | Brun et al. |
| 5,051,301 A | | 9/1991 | Singh et al. |
| 5,153,057 A | * | 10/1992 | Corbett et al. ............ 428/293.1 |
| 5,177,039 A | * | 1/1993 | Allaire et al. ............ 501/95.2 |
| 5,394,930 A | | 3/1995 | Kennerknecht et al. |
| 5,407,734 A | * | 4/1995 | Singh et al. ............ 442/391 |
| 5,529,620 A | * | 6/1996 | Corbett et al. ............ 106/272 |
| 6,136,237 A | * | 10/2000 | Straub et al. ............ 264/40.1 |
| 6,167,859 B1 | * | 1/2001 | Strasser et al. ............ 123/188.3 |
| 6,258,737 B1 | * | 7/2001 | Steibel et al. ............ 442/172 |
| 2002/0086165 A1 | | 7/2002 | Davis et al. |

FOREIGN PATENT DOCUMENTS

| | | |
|---|---|---|
| DE | 198 26 792 A1 | 12/1999 |
| EP | 0 562 597 A1 | 9/1993 |
| EP | 1116705 A1 | 7/2001 |
| GB | 1264 476 A | 2/1972 |
| WO | WO-02/07048 A2 | 4/2002 |

OTHER PUBLICATIONS

Bhatt, "Heat Treatment Effects on the Tensile Properties and Microstructure of a SiC/RBSN Composite in Nitrogen", Ceramics International. (1997).

\* cited by examiner

*Primary Examiner*—Mary Lynn F Theisen
(74) *Attorney, Agent, or Firm*—Fulbright & Jaworski L.L.P.

(57) ABSTRACT

Both ceramic and intermetallic materials as a rule have a very small elongation at break of distinctly less than 0.3% and therefore a break behaviour with low damage tolerance. In order to increase the damage tolerance, it is important to increase the elongation at break to at least 0.3% or more. This can be achieved by introducing, for example, fibres consisting of carbon or ceramic or metal fibres into the matrix. It is important in this respect for the distribution of the fibres in the matrix to be homogeneous and/or defined. It is of advantage and therefore as a rule desirable for the fibres for reinforcing a material or component to be oriented in a defined direction which is adapted to the main stress.

Therefore, according to the invention, a fibre-ceramic composite is proposed which consists of a ceramic matrix with a pore proportion of 0% to 75% and a fibre proportion of 5% by volume to 30% by volume, wherein the distribution of the fibres in the matrix is homogeneous and/or defined, and their quantity and orientation are optimized in relation to the material load.

18 Claims, No Drawings

POROUS FIBER-CERAMIC COMPOSITE

This application claims priority from German 103 57 070.5 filed Dec. 4, 2003 and DE 102004 01 2407.8 filed Mar. 13, 2004 3 52 816.4, herein incorporated by reference in their Entireties.

The invention relates to a porous fibre-ceramic composite for producing a preform or component, a method for the production thereof as well as the use of a preform or component.

Fibre-reinforced plastics and metals are prior art. For example, preforms of ceramic or carbon fibres as a component or as a segment of a component are infiltrated with a molten metal. The production of dense ceramic components from porous ceramic preforms through compaction processes such as, e.g. liquid-phase sintering, reaction sintering or so-called reaction bonding, is also known.

One possibility for producing a metal-ceramic composite (MCC), also called metal matrix composites (MMC), or an intermetallic material, also called intermetallic composites (IMC), is the infiltration of porous ceramic moulded bodies with molten metal. As regards the IMC material, the reaction between the metal and the ceramic to form the intermetallic phase may take place either during the casting process or during a subsequent heat treatment. Composites with a metal proportion of less than 50% are called, for example, ceramic-matrix composites (CMC).

Both ceramic and intermetallic materials as a rule have a very small elongation at break of distinctly less than 0.3% and therefore a break behaviour with low damage tolerance. In order to increase the damage tolerance, it is important to increase the elongation at break to at least 0.3% or more. This can be achieved by introducing, for example, fibres consisting of carbon or ceramic or metal fibres into the matrix. It is important in this respect for the distribution of the fibres in the matrix to be homogeneous and/or defined. It is of advantage and therefore as a rule desirable for the fibres for reinforcing a material or component to be oriented in a defined direction which is adapted to the main stress.

For example, a ceramic composite, a so-called ceramic matrix composite (CMC), in which a ceramic composite, which consists substantially of silicon carbide and silicon, is reinforced by carbon fibres is prior art.

The object of the invention is to present a porous fibre-ceramic composite as well as a method for producing a preform or component from this material and the use of the preforms or components.

The ceramic powder which forms the matrix for the fibres when shaping is carried out contains—in addition to the inorganic constituents of the subsequent moulded body—organic porosity-producing agents for producing the porosity and, in a known manner, binders and auxiliary pressing substances for the intended shaping. The porosity-producing agents and therefore the pore sizes in the finished moulded body are in the range between 0.1 and 100 µm. The pores may be open or closed, depending on the intended use of the moulded body. The pores may have a multimodal distribution for infiltration with a molten metal. The desired pore proportion and the pore structure are adapted both to the shaping and, optionally, infiltration process as well as the properties of the moulded body and are in the range from 30% to 75%. In the case of a moulded body which is intended for infiltration, for example with aluminium, the fibre/ceramic ratio may be approximately 5 to 30/40 to 15% by volume with a pore proportion of approximately 55%.

Suitable fibre materials are, e.g. carbon and ceramic such as, for example, $Al_2O_3$, mullite or silicates. The fibre diameters are, e.g. between 1 and 20 µm, the lengths, e.g. between 0.5 and 15 mm. Metal alloys such as, for example, steel, special steel or special alloys, e.g. of titanium-, chromium-, nickel-based alloys, or precious metals are also particularly suitable. The length of the fibres is as a rule distinctly greater, for example >1 mm, than the diameter of the ceramic spray grain, which is between 20 and 200 µm, for example. Typical dimensions of metal fibres are diameters of 0.1 to 0.8 mm and lengths of 3 to 15 mm. These different dimensions and forms make it impossible to prepare the raw materials together. For example, the fibres cannot be introduced during preparation of the ceramic powder and spray dried with the latter.

Fibre proportions of 5 to 30% by volume in the dense MCC or IMC are as a rule required. If the fibres are admixed to the powder in a dry state by means of a mixer and the mixture is subsequently poured into a pressing tool, the fibres will as a rule not be homogeneously distributed, as these fibres, because of their higher density and their geometry, have a flow behaviour which is different to that of the ceramic powder. Moreover, the fibres have a random orientation which may result in the fibres being deformed during compacting and, due to this, in considerable restoring moments, which in turn result in pressing faults.

A further object of the invention, when producing a porous ceramic preform, lies in disposing the more or less rigid fibres, for example metal fibres, in a homogeneous and defined and, optionally, oriented manner in the material and therefore in a moulded part consisting of the material according to the invention, as well as largely maintaining the existing orientation of the fibres in the material during pressing.

This is difficult, for example, in cases in which the direction of stress corresponds to the direction in which the pressing force has acted. Under the influence of the pressing force the fibres oriented in the direction of the acting pressing force generally yield to the pressure and either bend or give way to the pressure and take up directions which lie outside of the direction of the main load with adverse effects.

According to the invention, this can largely be prevented by "freezing in" the orientation of the fibres in the ceramic composition which is to be pressed, so that their position substantially remains unchanged during the pressing operation. The position of the fibres, which are oriented in the main stress direction and therefore parallel to the pressing direction, is substantially maintained. For this purpose the ceramic matrix powder is made up with the fibres through the addition of liquid and/or solid auxiliary substances, and the particles or granules and fibres are coated. Aqueous or organic solutions of polymers such as, e.g. polyvinyl alcohol, are used for the make-up. A relatively high concentration of the auxiliary substances, for example 10 wt. % of a 1% solution, in the powder-fibre mixture produces a composition which is hardly free-flowing and which may be in granule form. The consistency of this composition renders segregation and re-orientation of the fibres in the matrix when filling the mould and pressing difficult and even prevents it in the most favourable case.

The method according to the invention for producing a composition of this kind is presented on the basis of the embodiment. 2000 g of a spray-dried, easily free-flowing ceramic composition are mixed with 1200 g of metal fibres with a diameter of 0.5 mm and a length of 5 mm in a rotating granulation drum. 320 g of a 1% solution of polyvinyl alcohol in water is sprayed by means of an atomiser into the rotating drum and mixed in with the composition. This results in a moist composition which has the consistency of wet sand and in which the metal fibres are oriented in all three directions in space. This composition is poured into a mould measuring 300 mm×185 mm for pressing and axially compacted at 500 bar specific pressing pressure. The orientation of the fibres, in particular also that parallel to the pressing direction, is largely maintained in the moulded body.

A homogeneous distribution of the fibres in the component both in area and in volume can be achieved according to the invention. For this purpose the pressing tool is filled in layers for axial or isostatic dry pressing. Layers of ceramic powder alternate with layers of fibres, the latter covering just a certain proportion or the total area, and the packing density being variable. The fibre layer is covered when the next powder layer is poured in such that the interspaces between the fibres are filled. The filling of the interspaces may also be assisted through vibration. However measures must in this case be taken to ensure that the fibres and the powder do not separate. This may be prevented by coating the fibres, for example with the ceramic powder which is used. The coverage of the fibre layer may also be zero, depending on the intended application. The packing density of the fibres is as a rule so low that the individual powder layers can form a continuous matrix in the vertical direction. The thicknesses of the introduced fibre and powder layers are in this case variable and, depending on the component size and application, are in the range from 0.5 to 20 mm, for example.

The introduction of the individual fibre and powder layers may take place by means of, for example, chutes or vibrating troughs which are guided over the pressing mould, the female mould, or through a tool which is moved relative to the filling device. In this case either the tool can move in relation to the filling device, e.g. rotate in the case of round tools, or vice versa. The orientation of the fibres is determined by means of the angle and the spacing of the filling device from the tool bottom or the powder layer. The fibres can be more or less separated and oriented by means of an upstream vibrating device.

However the pressing mould can also be filled continuously and synchronously with powders and fibres by means of a plurality of filling devices, in which case a distribution and/or orientation of the fibres which is homogeneous or graduated over the component height can be produced.

When using magnetisable fibres, the pressing mould can also be filled via devices with electromagnets which can be energised and de-energised instead of via direct feed systems. The strength of the magnet or magnets, the feed of the fibres to the magnet, the position above the pressing mould and the instant of de-energisation then determine the distribution and the orientation of the fibres.

A homogeneous and/or directed distribution may also be achieved if organic wide-meshed fabrics provided with fibres are laid in layers in the pressing mould on powder layers previously poured in. The wide-meshed fabric enables the powder to be distributed in the vertical direction. The organic fabrics are burnt out through the heat treatment.

A further possibility is to introduce the fibres as a self-supporting skeleton, for example as steel wool. The skeleton is filled with ceramic powder or dispersions prior to or during shaping in the mould.

Extrusion may also be selected as the shaping method. The ceramic powders are not in this case prepared by spray-drying. The ceramic powders and the other raw materials and auxiliary substances are processed into a plastic composition, which is afterwards extruded. The fibres are fed to the strand which is to be produced by feeders. The orientation of the feeders relative to the composition strand and the sequences of movements of the composition relative to the feeders and within the mixing and shaping device determine the orientation of the fibres in the green compact.

If the fibres are not fed into the ceramic composition when the strand is produced, they can be subsequently introduced into the composition by so-called roll compacting. The fibres are in this case rolled into the plastic composition by rolls. Layers are formed from the mixture. These layers are then superimposed and joined together by pressure or laminated.

Hot casting of compositions is a further possibility for producing a fibre-ceramic composite with homogeneous fibre distribution. In this case the viscosity of the composition is adapted, for example, by selecting appropriate waxes and an appropriate temperature such that the fibres do not separate from the ceramic powder and the raw materials and auxiliary substances when poured into the pressing tool.

The free-flowing property and the dispersion behaviour of fibres and their behaviour in the ceramic matrix during shaping and in the subsequent moulded body or composite can be additionally adapted by coatings. Powder coatings, e.g. with the matrix powder, in order to reduce sedimentation and clustering of the fibres during shaping, or coatings with additional substances are possibilities. The fibres may also be coated with organic auxiliary substances in order to ensure that they are fixed in the matrix during the filling and shaping process. The coating may in this case consist of a thin sheath or of a relatively thick, multi-layer structure, e.g. of auxiliary substances and separated powder particles.

A porous ceramic body with fibres which are distributed and/or oriented in a homogeneous or defined manner may be used for a function-optimised porous body such as, for example, evaporator rods, filter material or insulating materials. The thermal conductivity and thermal capacity, for example, can be adapted through the choice of fibre material. However a porous ceramic-fibre body may also be used in particular to produce metal-ceramic composites (MCC) or ceramic materials or intermetallic composites (IMC) with improved elongation at break. This is of interest in particular for tribological and mechanical applications or where components with special safety requirements or functional properties are concerned. These include, for example, basic and mating bodies for friction systems or tribological applications such as, for example, brake drums, brake linings, couplings and the like, end brackets and mechanical engineering components which are subject to extremely high mechanical stresses.

The production of a preform or component from the porous fibre-ceramic composite according to the invention is described on the basis of an embodiment.

A granular material consisting of titanium oxide, 16% by volume of porosity-producing agent and 4% by volume of organic binder was strewn into a pressing mould of a diameter of 40 mm in alternation with metal fibres consisting of special steel. The metal fibres had diameters of approximately 0.25 mm and lengths of approximately 5 mm. A total of five layers of metal fibres and six layers of ceramic granular material were alternately strewn in such that the bottom and the top layer consisted of ceramic granular material. The granular material layers were approximately 3 mm thick, while the total fibre proportion was 25% by volume. The fibres were oriented horizontally. This layer structure was subsequently pressed axially at a pressure of 70 MPa and sintered at 1000° C. for one hour. The sintered part was approximately 8 mm high and had a total porosity of 58%. In spite of the high fibre proportion, no faults in the form of cracks occurred either during shaping or after sintering.

The invention claimed is:

1. A process for the manufacture of a rough body or component from a fiber-ceramic composite material with a composition comprising a ceramic matrix that is from 30 to 75% porous and contains a quantity of from 5 to 30% by volume of fibers, wherein the distribution of the fibers in the matrix is at least one of homogeneous or defined, and wherein the quantity and orientation of the fibers are optimized in relation to a material load by pressing in a mold, comprising putting the fibers and the material forming the ceramic matrix into a mold so that the fibers have at least one of a homogenous or defined distribution in the matrix, and adding the fibers to optimize the quantity and alignment of the fibers with respect to an anticipated stress on the fiber-ceramic composite material, and wherein the fibers retain a preset alignment.

2. A process according to claim 1 comprising filling a female mold of a pressing tool with a layer of ceramic powder to a previously cletenuined height, which is established according to the use of the component; depositing a layer of fibers thereon in a defined fiber orientation and defined layer thickness, in accordance with the use of and resulting load on the component, depositing a layer of ceramic powder thereon such that it flows into the interspaces between the fibers and fills them; continuing to deposit the ceramic powder until the fibers are covered to a predefined height, wherein the coverage is optionally zero, depositing another layer of fibers thereon, and alternatively depositing fibers and ceramic powder. until the mold is filled, wherein the last layer is of ceramic powder, and wherein the ceramic powder is mixed with a defined proportion of porosity-producing agents and, optionally, organic binders and auxiliary pressing substances, and pressing the material into the predetermined shape.

3. The process according to claim 2, wherein the height and packing density of the fiber layer are selected such that the powder layers can form a continuous matrix.

4. The process according to claim 2, wherein the fiber and powder layers are foined to heights of between 0.5 mm and 20 mm, according to the component size.

5. The process according to claim 2 wherein the introduction of the fibers and the powder takes place by means of chutes or vibrating troughs.

6. The process according to claim 2, wherein the orientation of the fibers is determined by the angle and the spacing of the filling device from the pressing mold bottom or the powder layer.

7. The process according to claim 2, wherein the fibers arc separated and oriented by means of a vibrating device connected upstream of the filling device.

8. The process according to claim 2, wherein the feed and the distribution and orientation of magnetisable fibers take place by means of magnets.

9. The process according to claim 2, wherein the pressing mold is filled synchronously by means of separate filling devices for powder and fibers.

10. The process of claim 1, comprising filling the female mold of a pressing tool with a layer of ceramic powder to a previously determined height which is established according to the use of the component; depositing an organic fabric provided with fibers thereon in a defined thickness and with a defined fiber orientation which depends on the use of and resulting load on the component; depositing a layer of ceramic powder thereon such that it flows into the interspaces of the fabric and fills them; continuing to deposit the ceramic powder until the fabric is covered to a predefined height, which is optionally depositing another zero; a layer of fabric thereon; and alternately depositing fabric and ceramic powder until the mold is filled, wherein the last layer is ceramic powder; the ceramic powder is mixed with a defined proportion of porosity-producing agents; and pressing the material is pressed into the intended shape.

11. The process according to claim 10, wherein the fibers form a self-supporting skeleton which is filled with ceramic powder or a ceramic dispersion, and that wherein the body which is thus produced is pressed into the intended shape in a known manner.

12. A method for producing a preform or component from a fiber ceramic composite according to claim 1, wherein the ceramic powder, mixed with auxiliary substances such as water, organic plasticizing agents, for example cellulose, polymers and binders, is processed into a plastic composition, which is afterwards extruded, wherein the fibers are fed to the extrusion by means of feeders, and wherein the composition is poured, injected or extruded into the mold.

13. A method for producing a preform or component from a fiber ceramic composite according to claim 1, wherein the ceramic powder, mixed with auxiliary substances such as water or organic solvents, organic plasticizing agents, inter alia cellulose, polymers and binders, is processed into a plastic composition, which is afterwards molded wherein the fibers are subsequently rolled into the plates by means of roll compacting, that this composition is introduced into the pressing mold in layers and pressed into the intended shape in a known manner.

14. A method for producing a preform or component from a fiber ceramic composite according to claim 1, wherein the ceramic powder is mixed with appropriate auxiliary substances such as waxes, that this mixture is liquefied, that the fibers are added, that the composition is poured into the mold such that the fibers take up a predetermined direction, and that the composition is then solidified in a known manner.

15. A method for producing a preform or component from a fiber ceramic composite according to claim 1, wherein the ceramic powder is made up with the added fibers by means of liquid and/or solid auxiliary substances, and a composition which is hardly free-flowing, comparable in consistency with wet sand or granular material, is produced from the powder-fiber mixture, and the material is pressed into the intended shape in a known manner.

16. The method according to claim 15, wherein the fibers are coated to adapt their free-flowing property and their dispersion behaviour.

17. The process according to claim 16, wherein the coating is a powder coating with the ceramic powder.

18. The process according to claim 16, wherein the coating consists of a plurality of layers, of organic auxiliary substances in the form of powders or liquids and ceramic powder particles.

* * * * *